Oct. 3, 1950     M. W. LEWIS     2,524,452
CLUTCH STARTER
Filed May 18, 1948     2 Sheets-Sheet 1
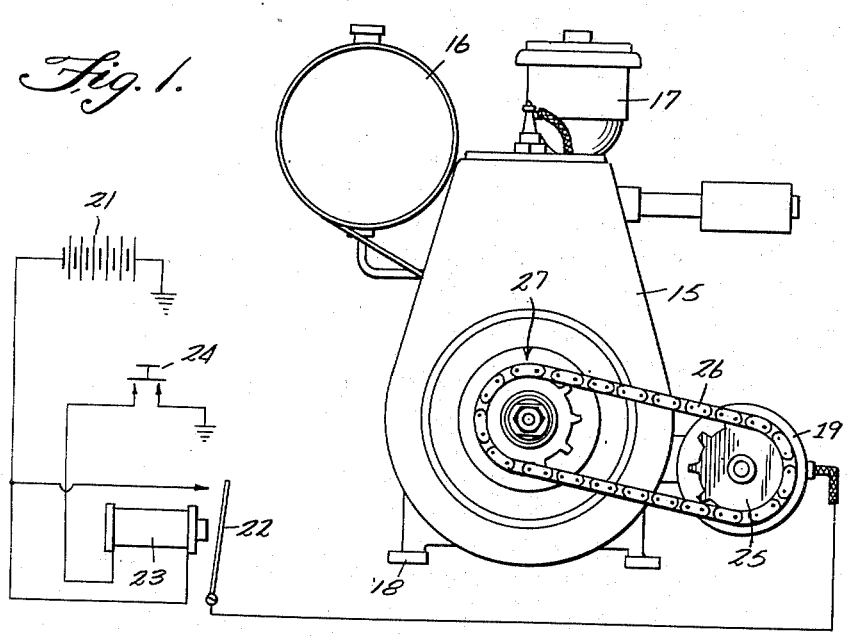
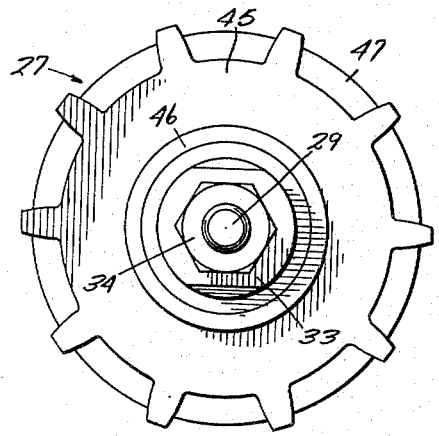
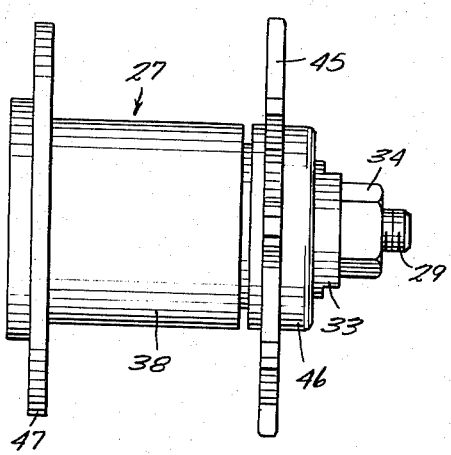
INVENTOR.
Melvin W. Lewis,
BY Victor J. Evans & Co.
ATTORNEYS Oct. 3, 1950   M. W. LEWIS   2,524,452
CLUTCH STARTER
Filed May 18, 1948   2 Sheets-Sheet 2
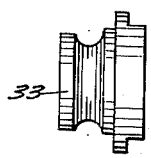
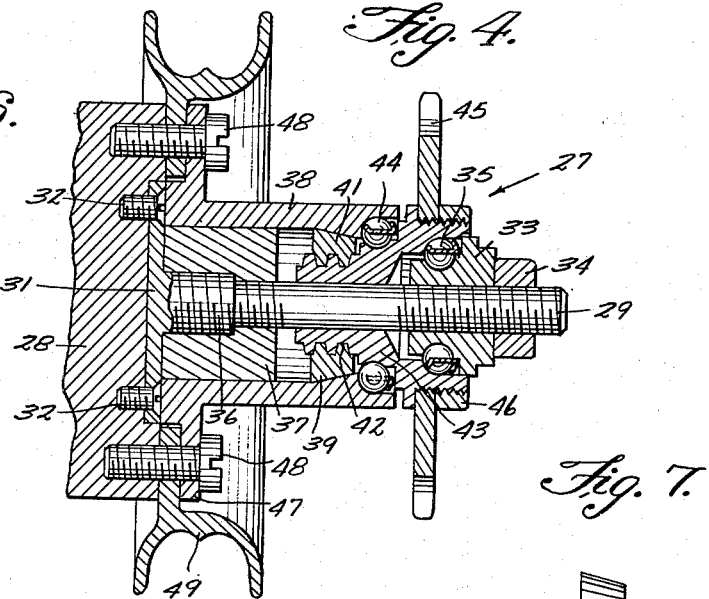
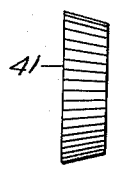
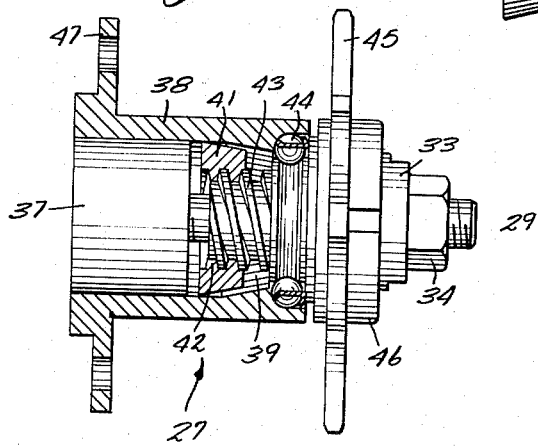
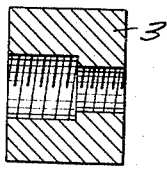
INVENTOR.
Melvin W. Lewis,
BY Victor J. Evans & Co.
ATTORNEYS Patented Oct. 3, 1950

2,524,452

UNITED STATES PATENT OFFICE 2,524,452

CLUTCH STARTER

Melvin W. Lewis, San Bernardino, Calif.

Application May 18, 1948, Serial No. 27,707

1 Claim. (Cl. 74—7)

This invention relates to a clutch starting device for small gasoline engines.

It is an object of the present invention to provide a starting device for a gasoline engine of the small type wherein through a set of sprocket devices extending between the engine and an electric starting motor, the engine can be turned over and become automatically free of the sprocket devices as it is ignited or started and wherein a clutch is provided upon and connected with the engine through the means of the same fastening elements which connects the driving pulley with the engine.

Other objects of the present invention are to provide a clutch type starting device for small gasoline engines which is of simple construction, inexpensive to manufacture, easy to install upon the engine and efficient in operation.

For other objects and for a better understanding of the invention reference may be had to the following detailed description taken in connection with the accompanying drawing, in which Fig. 1 is an end elevational view of the engine having the starting device of the present invention connected thereto and wherein there is extended from the electric motor a wiring diagram.

Fig. 2 is an enlarged end elevational view of the engine sprocket.

Fig. 3 is a side elevational view of the starter clutch removed from the engine.

Fig. 4 is a longitudinal sectional view taken through the starter clutch and connected with the driving pulley to the engine shaft, the clutch element being drawn into engagement with the sleeve element to effect a drive through the starter.

Fig. 5 is a sectional view of the starter with the clutch element relieved from the sleeve and in the position as when the engine is operating under its own power.

Fig. 6 is a side elevational view of a ball bearing retainer.

Fig. 7 is a side elevational view of the clutch element.

Fig. 8 is a longitudinal sectional view of the clutch element.

Fig. 9 is a longitudinal sectional view of the internal sleeve.

Referring now to the figures, 15 represents a gasoline engine having a fuel tank 16, air filter 17 and other parts necessary for its operation. The engine rests upon feet 18 and to the side of the same there is connected an electric starting motor 19. This electric motor receives current from a battery source 21 upon switch arm 22 being drawn to a closed position by an electromagnet 23 connected to the battery source 21 and to a push button 24 which is normally opened. On depressing the button 24, the electric motor 19 will rotate its sprocket 25 and a chain 26 thereon. The chain in turn will operate catch starter device 27 connected with the engine drive shaft and embodying the features of the present invention.

The engine drive shaft is indicated at 28, Fig. 4, and on the same there is connected a threaded rod extension 29 having a flange 31 which is connected by screws 32 with the end of the engine shaft.

On the end of the extension, there is coupled a ball bearing retainer 33 which is made secure thereon by a nut 34. In this retainer is a cluster of ball bearings 35. The retainer 33 will rotate with the extension 29. Also on the extension and threaded to a shoulder portion 36 thereof is an internal sleeve 37, Fig. 9, over which is extended an external sleeve 38 having an internal clutch-engaging surface 39 for receiving a tapered or conical clutch element 41 having internal fast threads 42 operable upon an externally threaded drive element 43 connected through a ball bearing race 44 to the interior of the sleeve 38 and to the end thereof. This externally threaded member 43 has a sprocket 45 fixed to the same by a nut 46. The chain 26 extends over the sprocket element 45.

The external sleeve 38 has a flange 47 which is connected by fastening nuts 48 with a drive pulley 49 to the shaft 28.

As the sprocket 45 is turned in one direction, the clutch element 41 is drawn into engagement with the face 39 of the sleeve 38 whereby to couple the sprocket through the member 43 with the sleeve 38 and the shaft 28 through the fastening bolts 48 to cause the engine shaft to be turned. As the engine starts, the shaft 28 will be turned in the reverse direction and the clutch element will be disengaged from the clutching face of the sleeve 38 to assume the position shown in Fig. 5.

While various changes may be made in the detail construction, it shall be understood that such changes shall be within the spirit and scope of the present invention as defined by the appended claim.

I claim:

A clutch starting device for a gasoline engine comprising a rod extension having a threaded portion at one end and an enlarged threaded shoulder portion at the opposite end with the portion of the rod extension inwardly of the shoulder also threaded, a flange on the rod extension integral with the shoulder whereby said rod extension may be secured to the drive shaft of the gasoline engine, an internal sleeve threadably connected to the shoulder position and the threaded portion of the rod extension adjacent the shoulder portion, an external sleeve surrounding the internal sleeve and having a flange thereon whereby said external sleeve may be connected to the drive shaft of the gasoline engine, said external sleeve having an internal clutch engaging surface of tapered formation, an anti-friction means on the first said threaded portion of said rod extension, an externally threaded drive element rotatably mounted on said anti-friction means, sprocket means mounted on said drive element, a nut on said external threaded drive element outwardly of said sprocket means and adapted to fix said sprocket means to said drive element, said drive element adapted to extend into said external sleeve and a ball bearing race between said drive element and said external sleeve, internal fast threads on said drive element inwardly of said ball bearing race, a clutch element operable upon said fast threads, said clutch element having an external surface complementary to and adapted to engage the internal clutch engaging surface of said external sleeve, the drive element adapted to draw the clutch element into engagement with the clutch engaging surface of the external sleeve upon the sprocket means being turned in one direction and adapted to permit the clutch element to be disengaged therefrom upon the drive shaft of the engine running ahead of said drive element.

MELVIN W. LEWIS.

REFERENCES CITED

The following references are of record in the file of this patent:

UNITED STATES PATENTS

| Number | Name | Date |
|---|---|---|
| 1,727,086 | Vastano | Sept. 3, 1929 |
| 1,922,350 | Bolton | Aug. 15, 1933 |

FOREIGN PATENTS

| Number | Country | Date |
|---|---|---|
| 507,806 | France | Sept. 26, 1920 |